March 24, 1970 R. A. MUNSE 3,501,827
TOOL FOR ASSEMBLING SPRING METAL C-CLIPS TO PANELS
Filed Oct. 9, 1967 3 Sheets-Sheet 1
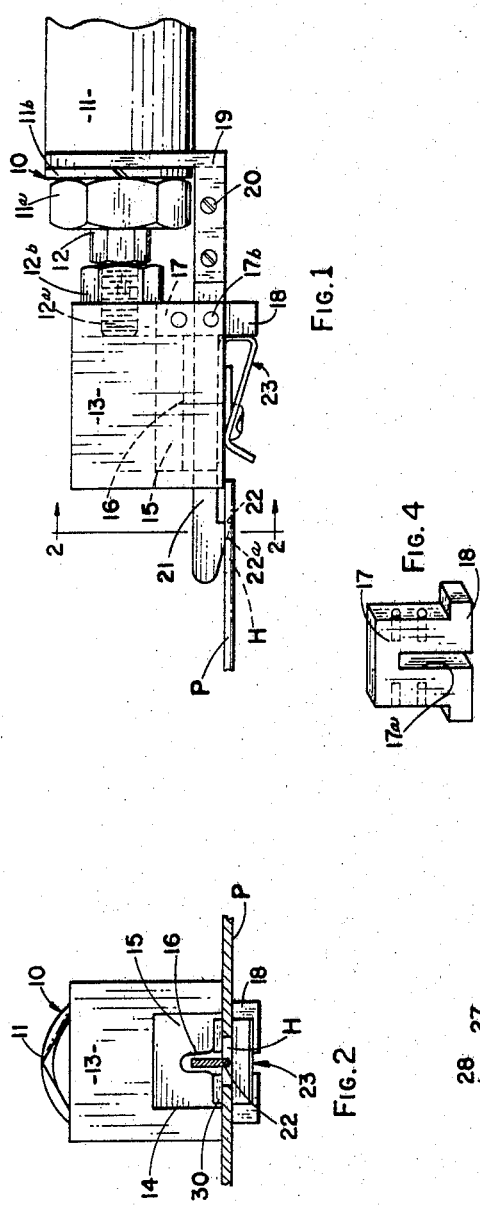
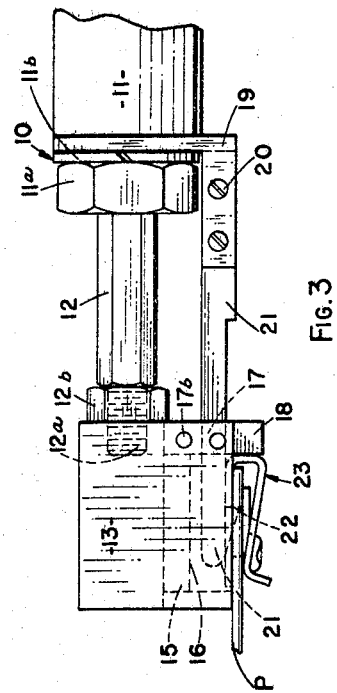
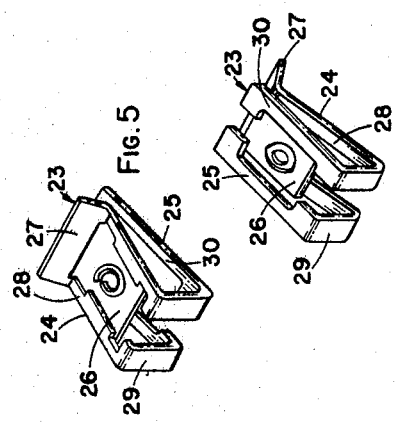
INVENTOR.
ROBERT A. MUNSE
BY
HIS ATTORNEY

INVENTOR.
ROBERT A. MUNSE
BY
HIS ATTORNEY

March 24, 1970 R. A. MUNSE 3,501,827
TOOL FOR ASSEMBLING SPRING METAL C-CLIPS TO PANELS
Filed Oct. 9, 1967 3 Sheets-Sheet 3
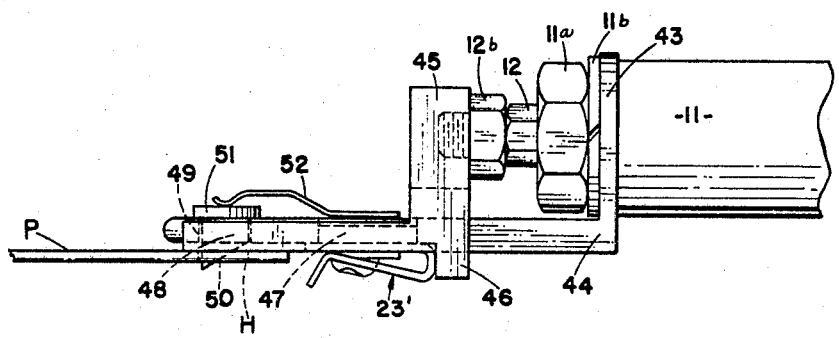
FIG. 10
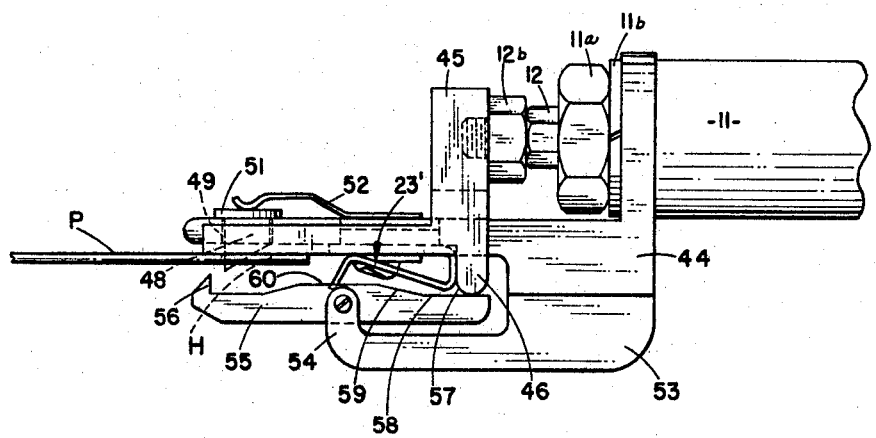
FIG. 11
INVENTOR.
ROBERT A. MUNSE
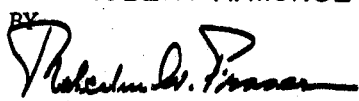
HIS ATTORNEY United States Patent Office
3,501,827
Patented Mar. 24, 1970

3,501,827
TOOL FOR ASSEMBLING SPRING METAL C-CLIPS TO PANELS
Robert A. Munse, Perrysburg, Ohio, assignor, by mesne assignments, to Microdot Inc., New York, N.Y., a corporation of California
Filed Oct. 9, 1967, Ser. No. 673,608
Int. Cl. B23p *19/04*
U.S. Cl. 29—225                              9 Claims

ABSTRACT OF THE DISCLOSURE

A tool for applying spring metal C-clips having a nut in one arm to an apertured panel has a power operated reciprocal ram provided with a head to which a clip is applied in such position that when the ram advances the clip is forced over the edge of the panel, the arms of the clip opening to engage opposite faces of the panel. The tool has a locator arm which has a hook at its outer end to engage in a hole in the panel to guide the ram operation and cause the clip to be properly positioned with its nut in alignment with the panel hole.

SUMMARY

Spring metal C-clips are used extensively in the automobile, refrigerator, stove and other industries for application to panels for connecting parts together. Ordinarily they are very small pieces and the arms have their free ends in engagement so that it is difficult to apply them to an edge of the panel. It is usual for a workman to place a clip at the edge of a panel and then hit it with a hammer. Not infrequently the clip is not hit properly and it flies. This is not only time consuming, but inefficient and wasteful. Where the clip has a nut, it is necessary that proper alignment with the panel hole be made and this also presents a problem when manual application is carried on.

This invention provides a simple tool for applying these clips. It makes possible faster and more accurate and dependable assembly. It is power operated so that a minimum of effort is required. All that is required is to position the tool with the locator engaging the panel hole, and then causing a ram to operate for abruptly mounting the clip in a true and accurate manner.

BRIEF DESCRIPTION OF THE DRAWINGS

FIGURE 1 is a fragmentary side elevation of a tool for assembling C-clips to an apertured supporting panel with the parts shown in normal or retracted position;

FIGURE 2 is a sectional view on the line 2—2 of FIGURE 1;

FIGURE 3 is a side elevation of the tool similar to that shown in FIGURE 1, but showing the parts advanced to force the C-clip over the supporting panel;

FIGURE 4 is a perspective view of the pusher member forming a part of the tool shown in FIGURES 1 to 3;

FIGURE 5 is a top perspective view of a fastener for use in connection with the tool shown in FIGURES 1 to 4;

FIGURE 6 is a bottom perspective view of the clip shown in FIGURE 5;

FIGURE 10 is a fragmentary side elevation of an alternative form of tool for assembling C-clips to an apertured panel in which the locator is yieldingly held by a leaf spring in operative position; and, FIGURE 11 is another form of fastener shown in fragmentary side elevation, the same being similar to that shown in FIGURE 10, but equipped with a catch arm for retaining the locator in the panel hole until the clip has been applied to the panel.

DESCRIPTION OF THE PREFERRED EMBODIMENT

Figure 7:
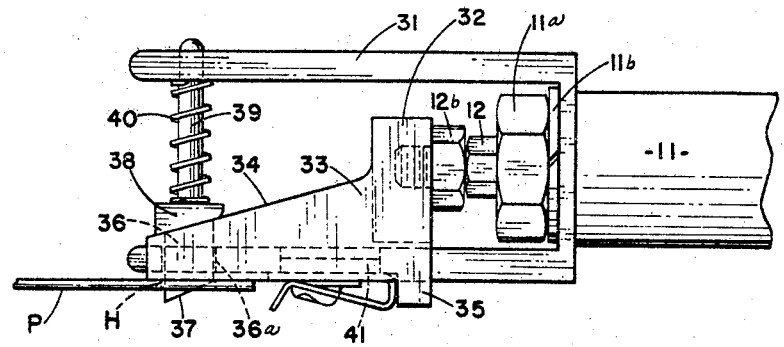
FIGURE 7 is a fragmentary side elevation of an alternate form of tool with the parts in normal or retracted position, the same being adapted for handling a clip of the type shown in FIGURE 9.

An assembly tool as shown in FIGURES 1 to 4 has an operating cylinder 11 at the front end of which is attached a mounting nut 11a which bears against a washer 11b. The operating cylinder 11 may be that of a fluid operated reciprocating piston and cylinder assembly or, alternatively, may constitute an electric solenoid, the armature of which is advanced and retracted in a manner well known in the art. Reciprocable in and out of the cylinder 11 is a ram or piston rod, as the case may be, which is of polygonal shape so as to be nonrotating. As shown, the ram has a reduced screw threaded extension 12a which threadedly engages a head 13, a jamb nut 12b securing the parts rigidly together. The head 13 is in the form of a block, which is formed with a rectagonal cavity 14 in its under side, the bottom and opposite ends of the cavity 14 being open. Having a press fit within the cavity 14, is a permanent magnet insert 15 of generally rectangular form, the bottom of which is spaced slightly above the bottom of the cavity 14. In the insert 15 is a slot 16 which extends from end to end and is open at its bottom.

Fitting the cavity 14 in the head 13 and disposed directly in rear of the permanent magnet insert 15 is a pusher member in the form of a block 17, which also has a press fit within the cavity 14 and is retained by pins 17b. The block 17 has a horizontal slot 17a which extends from front to rear and registers with the slot 16 in the permanent magnet insert 15. At the lower end of the pusher block 17 are oppositely extending flange portions 18 which engage the underside of the head 13.

Intermediate the washer 11b and the cylinder 11 and retained in place by the mounting nut 11a is an L-shaped bracket 19, the lower part of which projects forwardly of the cylinder 11. Secured to the forwardly extending portion of the bracket 19 by screws 20 is a pilot stem or locator 21. The locator 21 extends through the registering slot 17a in the pusher block 17 and the slot 16 in the permanent magnet insert 15 and the forward end of the locator 21 projects beyond the front face of the head 13. On the under side of the front end or nose of the locator 21 is a downwardly and rearwardly inclined surface 22a which terminates in a hook 22.

The assembly tool above described is for applying sheet metal spring C-clips to a panel P is formed near an edge thereof with a hole H. In the first instance, the pilot stem is engaged in the hole H by the hook 22. A spring clip, as indicated at 23, is applied to the under side of the head 13 and retained in place by the magnetic attraction of the permanent magnet insert 15. Thereafter, by the actuation of the ram or piston rod 12, through the motivating force within the cylinder 11, the head is advanced along the locator 21, forcing apart the arms of the C-clip 23 and advancing the same until the C-clip is positioned with predetermined orientation to the panel hole H.

A C-clip of the type for use in connection with the tool above described is shown on FIGURES 5 and 6, FIGURE 5 being a perspective view showing one side of the clip and FIGURE 6 being a perspective view showing the opposite side of the clip. Detailed description of the C-clip is not considered necessary here, but reference is heregy made to the application to Robert A. Munse Ser. No. 593,919 filed Nov. 14, 1966, now Patent No. 3,414,035 wherein the particular form of clip is fully described. Suffice it to say here, that the C-clip 23 is of spring sheet metal and has an upper arm 24 and a lower arm 25. In the upper arm 24 is a plate-like body 26, provided with a centrally disposed nut impression. The body 26 is free, except for one end which is integral with an upwardly inclined cross piece 27. Also forming a part of the upper arm 24 and disposed on opposite sides of the body 26, are parallel spring strips 28, the outer ends of which are integral with vertically disposed connecting portions 29 disposed at about right angles to the spring strips 28. The opposite ends of the connecting portions 29 are integral with upwardly inclined spring strips 30 respectively, which form the lower arm 25. The spring strips 30 are spaced apart throughout their length so as to provide an open slot from end to end.

For applying the C-clip 23 by the use of the above described tool, the lower arm 25 is held in place by the permanent magnet insert 15 and the strip connecting portions 29 abut the pusher member 17. The end to end slot between the spring strips 30 of the lower arm 25 provides space for the locator 21. Thus, the inclined cross piece 27 is downwardly disposed and arranged at the front, as indicated in FIGURES 1 and 3. When the spring clip 23 is in the position above described, the advancing movement of the head 13 along the locator 21 forces the spring clip abruptly upon the panel P so that the arms 24 and 25 are spread apart to engage opposite faces of the panel P. The advancing movement of the head 13 continues until the spring strip connecting portions 29 engage the free edge of the panel P. It will be understood that the hole H is so spaced from the edge of the panel that when the clip has been fully advanced, but nut impression on the plate-like body 26 is disposed in registry with the hole H so that a screw introduced through the hole can be easily applied.

Figure 8:
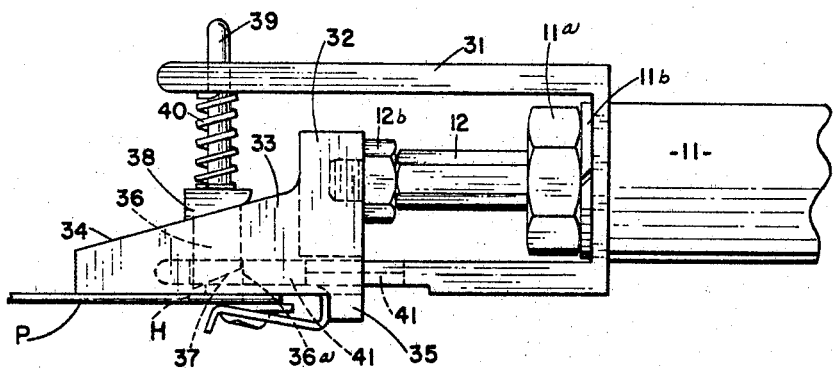
FIGURE 8 is a fragmentary side elevation of the tool shown in FIGURE 7 with the parts in advanced position just prior to the full positioning of the clip on the panel.
Figure 9:
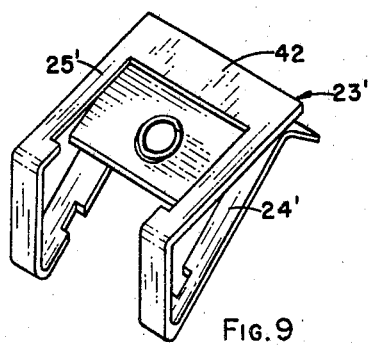
FIGURE 9 is a bottom perspective view of a clip for use with the tool shown in FIGURES 7 and 8.

FIGURES 7 and 8 show an alternate form of assembly tool particularly adapted for the assembly to an aperture panel of a spring clip of the type shown in FIGURE 9. The motivating parts of this tool are the same as above described and on these figures corresponding reference numbers are used. In this tool there is a horizontally disposed U-bracket 31, which is clamped to the operating end of the cylinder 11 by the mounting nut 11a and the washer 11b. The non-rotating ram or piston 12 is secured to the rear of a rectangular head block 32 in a similar manner employing the jamb nut 12b. Suitably fixed to opposite sides of the head block 32 are laterally spaced vertically disposed wings 33 (only one of which is shown on the drawings). The wings 33 which project forwardly of the head block 32 have downwardly and forwardly inclined cam edges 34 for a purpose hereinafter described.

Depending from the rear portion of the wings 33 is a pusher extension 35. At the forward end of the lower arm of the U-bracket 31 and extensible through a hole 36a is a vertically reciprocal pilot or locator 36. Formed on the bottom end of the locator 36 is an upwardly and rearwardly inclined cam surface 37. The locator 36 has a cam follower portion 38 which rides along the cam edges 34 when the head block 32 is advanced. Rigid with the upper end of the locator 36 above the follower 38 is an upwardly extending stem 39 which is freely slidable through a hole in the upper arm of the U-bracket 31. Encircling the stem 39 and disposed between the upper arm of the U-bracket 31 and the cam follower 38 is a coil spring 40, which yieldingly resists upward movement of the cam follower and locator 36 when actuated by the advancing movement of the wings 33. Suitably fixed to the lower arm of the U-bracket 31 is a permanent magnet block 41 for retaining the spring clip 23' in position as above described.

The spring clip 23' is similar to the clip 23 above described and has an upper arm 24' and a lower arm 25'. The difference between this clip and that above described is that in this case there is an integral transverse cross piece 42 at the free ends of the spring arms which provide the under arm 25'.

In operation of the assembly tool shown in FIGURES 7 and 8 the spring clip 23' is retained in position by the permanent magnet block 41 with the bend portion in engagement with the pusher extension 35 and with the underside 25' in engagement with the permanent magnet block 41. The tool is applied to the panel P with the locator 36 extending into the hole H. Then in response to the motivating force, the head 32 and associated parts are abruptly moved forwardly causing the arms of the clip to separate so as to engage opposite sides of the panel P. During such advancing the cam surfaces 34 force the locator 36 upwardly to enable the clip to be forced into position so that the nut impression is disposed in registry with the hole H of the panel P. When the head block 32 is retracted or upon lifting the tool away from the panel P, the head block 32 returns to its normal position and the coil spring 40 returns the locator 36 to its original position. Thus, in connection with this tool, it is not necessary that the lower arm of the C-clip be provided with a slot extending from end to end, as in the case of the clip shown in FIGURES 5 and 6.

In the alternative form shown on FIGURE 10, the tool is for use in assembling a clip of the type shown in FIGURE 9. In this instance, an L-shaped bracket 43 has one arm portion clamped to the head end of the cylinder 11 by the mounting nut 11a and washer 11b. The forwardly extending arm 44 of the bracket 43 is straddled by a depending extension 46 of the head block 45, which is secured to the non-rotating ram 12. Fixed as by a press fit to the forwardly extending bracket arm 44 is a permanent magnet block 47. In advance of the permanent magnet block 47 and carried by the arm 44 is a locator or pilot 48 which reciprocates vertically through a hole 49 in the arm 44. At the lower end of the locator or pilot 48 in an upwardly and rearwardly inclined cam surface 50 and on the upper end of the locator 48 is a disk-like head 51, against which bears the free end of a leaf spring 52, the opposite end of which is suitably fixed to the upper surface of the bracket arm 44.

It will be manifest that the spring clip 23' is applied to the tool in the manner described in connection with the previous figures and, upon advancing movement of the ram and its associated parts, the free end of the clip engages the cam surface 50 of the locator 36 and causes the latter to shift upwardly out of the hole H in the panel P, thereby enabling the clip to be applied to the panel P in the desired manner.

A further form of the invention is shown on FIGURE 11 and the tool shown in this figure is very similar to that shown and described in connection with FIGURE 10. However, in this form, there is a depending bracket extension 53 secured to the under side of the bracket arm 44. The bracket extension 53 has a forwardly extending arm terminating in an upwardly extending end portion 54. Pivoted intermediate its ends to the upwardly extending end portion 54 is a catch arm 55, which has a hook 56 at its forward end. The hook 56 engages the bottom end of the locator 48 and retains it in such position. This is accomplished by having a rounded end 57 on the head extension 46, and in the idle position of the parts, the rounded end portion 57 engages a horizontal edge at the rear end of the catch arm 55. In advance of the horizontal edge 58 is an upwardly and forwardly inclined edge 59, which merges with an upper horizontal surface 60.

In operation, when the parts are advanced to apply the spring clip 23' to the panel P, the rounded end portion 57 moves into engagement with the upwardly inclined portion 59, thereby rocking the catch arm 55 in a clockwise direction to elevate the hook 56 for engagement with the projecting portion of the locator 48. The hook 56 remains in such position until the rounded end portion 57 has passed over the inclined portion 59 and reaches the horizontal portion 60, whereupon the catch arm 55 is then rocked in the opposite direction to release the locator 48. Upon return of the parts to the normal position, the catch arm 55 will be returned to its inoperative position as shown on FIGURE 11.

From the above described, it will be understood that there is provided an extremely simple assembly tool by which relatively small spring clips can be quickly and efficiently applied to an apertured panel. The pilot or locator properly position the tool so that when the clip is applied to the panel, the nut impression in the clip will be disposed properly in register with the panel hole so that a screw can be applied expeditiously and without the necessity of shifting the clip in one direction or another to align the screw impression. If desired, means for feeding successively clips to the tool may be provided to obviate the necessity of positioning individual clips on the tool for application to a panel. This may be achieved in several ways, one being a spring loaded magazine carrying a series of clips which can be automatically shifted one after the other to the proper position on the tool.

Numerous changes in details of construction, arrangement and operation may be effected without departing from the spirit of the invention, especially as defined in the appended claims.

What I claim is:

1. Apparatus for assembling a spring metal C-clip to an apertured panel, the C-clip having a pair of generally parallel arms and having a nut on one arm and a longitudinal channel in the other arm, said apparatus comprising
   a cylinder,
   a power-actuated ram reciprocal in opposite directions with respect to said cylinder,
   a head for said ram,
   means for holding a C-clip to said head for advancing movement therewith and so that the free ends of the arms of the clip are in position to straddle opposite faces of the panel, and a locator including a bracket secured to said cylinder,
     said bracket having a locator nose with a terminal portion extending generally transverse to the directions of ram reciprocation to extend into the aperture of the panel,
   thereby enabling the head to force the clip to a position oriented with respect to the panel aperture and guided thereto by said locator.

2. Apparatus as claimed in claim 1 for assembling a C-clip having a pair of generally parallel arms and having a nut on one arm and a longitudinal end to end slot in the other arm, in which said head has a slot extending from end to end, and said locator constitutes a stem disposed in said slot and the slot of the C-clip.

3. Apparatus as claimed in claim 2, comprising a hook on the end portion of said locator stem for engagement in the panel aperture.

4. Apparatus as claimed in claim 1, in which said C-clip holding means comprises a permanent magnet.

5. Apparatus as claimed in claim 1, in which said head is slotted to receive and ride over said bracket for guiding said head in its reciprocal movement.

6. Apparatus as claimed in claim 1, in which said ram is non-rotating, and said holding means comprises a permanent magnet in the form of a block secured to the underside of said head.

7. Apparatus as claimed in claim 6, in which said locator comprises a spring biased part vertically reciprocable in said bracket and having a cam surface on its lower end engageable by the C-clip when applied to the panel to force it out of the panel aperture as the C-clip advances.

8. Apparatus as claimed in claim 7, comprising catch means automatically engageable with said spring biased part for retaining same in the panel aperture until the clip has been applied to the panel.

9. Apparatus as claimed in claim 1, in which said bracket comprises a horizontal U frame and the locator comprises a pin slidable through a hole in the lower arm of said frame, a head on said pin provided with a cam face on its underside, a stem on said head having its upper end slidable through a hole in the upper arm of said frame, a helical spring on said stem abutting said head and said upper arm, and cam means carried by said head and engaging said cam face for lifting the locator out of the panel aperture when the C-clip has been applied to the panel.

References Cited

UNITED STATES PATENTS

| | | | |
|---|---|---|---|
| 1,633,110 | 6/1927 | Koons | 29—249 |
| 2,895,214 | 7/1959 | Erdmann | 29—229 |
| 2,158,168 | 5/1939 | Woodruff. | |
| 2,176,116 | 10/1939 | Baetzhold. | |
| 3,083,597 | 4/1963 | Best | 81—15.7 |
| 3,324,538 | 6/1967 | Christensen. | |

OTHELL M. SIMPSON, Primary Examiner

J. C. PETERS, Assistant Examiner